United States Patent
Tsaur et al.

(10) Patent No.: US 10,229,029 B2
(45) Date of Patent: Mar. 12, 2019

(54) EMBEDDED INSTRUCTION SETS FOR USE IN TESTING AND ERROR SIMULATION OF COMPUTING PROGRAMS

(71) Applicant: Oracle International Corporation, Redwood City, CA (US)

(72) Inventors: Erwin Tsaur, Fremont, CA (US); Xiangtao You, San Jose, CA (US); Xiao-dong Zhao, Beijing (CN)

(73) Assignee: Oracle International Corporation, Redwood City, CA (US)

( * ) Notice: Subject to any disclaimer, the term of this patent is extended or adjusted under 35 U.S.C. 154(b) by 714 days.

(21) Appl. No.: 14/247,410

(22) Filed: Apr. 8, 2014

(65) Prior Publication Data

US 2015/0286557 A1   Oct. 8, 2015

(51) Int. Cl.
  *G06F 11/34* (2006.01)
  *G06F 11/36* (2006.01)
(52) U.S. Cl.
  CPC ...... *G06F 11/3466* (2013.01); *G06F 11/3624* (2013.01)
(58) Field of Classification Search
  CPC .................................................. G06F 11/3466
  USPC ....................................................... 717/128
  See application file for complete search history.

(56) References Cited

U.S. PATENT DOCUMENTS

| 6,526,408 B1 | 2/2003 | Squillace et al. | |
| 7,039,899 B1 * | 5/2006 | Quiroga | G06F 11/3684 714/E11.207 |
| 7,260,597 B1 * | 8/2007 | Hofrichter et al. | 709/200 |
| 8,132,157 B2 * | 3/2012 | Dhuvur et al. | 717/124 |
| 8,516,229 B2 | 8/2013 | Adir et al. | |
| 2007/0234305 A1 * | 10/2007 | Mishra et al. | 717/128 |
| 2008/0148257 A1 | 6/2008 | Ruml et al. | |
| 2008/0263342 A1 | 10/2008 | Knowles et al. | |
| 2009/0044096 A1 * | 2/2009 | Gupta et al. | 715/230 |
| 2011/0214110 A1 * | 9/2011 | Baron et al. | 717/153 |

(Continued)

FOREIGN PATENT DOCUMENTS

| EP | 2565790 A1 | 3/2013 |
| WO | 2012103955 A1 | 8/2012 |

OTHER PUBLICATIONS

N. Tracey et al., "Automated Test-Data Generation for Exception Conditions" Software Practice and Experience (SP&E), Softw/ Prac. Exper. 2000; 30:61-79.

*Primary Examiner* — Li B. Zhen
*Assistant Examiner* — Bradford F Wheaton
(74) *Attorney, Agent, or Firm* — Marsh Fischmann & Breyfogle LLP; Jonathon A. Szumny (57) ABSTRACT

Systems and methods for allowing software developers and the like to embed various different types of code and/or data manipulations into a software product. The embedded code manipulation instructions may be accessed and executed by test engineers or other users to induce fault paths and the like in the software product at run-time for analyzing the software's response to the induced fault paths. For instance, a user application of a software manipulation framework may expose a list of all of the instruction sets to a test engineer or the like in conjunction with one or more testing procedures to be performed on the software. Unless accessed by the test engineer, all of the testing probes may be represented by noops or placeholders at runtime to limit performance impact on the software.

19 Claims, 6 Drawing Sheets

(56) References Cited

U.S. PATENT DOCUMENTS

| | | | |
|---|---|---|---|
| 2011/0289487 A1* | 11/2011 | Song | G06F 11/3624 717/130 |
| 2012/0278725 A1* | 11/2012 | Gordon | H04N 21/2665 715/738 |
| 2013/0086426 A1 | 4/2013 | Choi et al. | |
| 2013/0318400 A1 | 11/2013 | Liang et al. | |

* cited by examiner

EMBEDDED INSTRUCTION SETS FOR USE IN TESTING AND ERROR SIMULATION OF COMPUTING PROGRAMS

BACKGROUND

1. Field of the Invention

The present invention generally relates to testing of programs and software such as kernels and drivers and, more particularly, to frameworks for injecting faults into or otherwise simulating errors in test code paths of software to assess the appropriateness of exception handling by the software.

2. Relevant Background

Software testing is any activity aimed at evaluating an attribute or capability of a program or system and determining that it meets its required results. Although crucial to software quality and widely deployed by programmers and testers, software testing still remains an art, such as due to sometimes limited understanding of the principles of software. The purpose of testing can be quality assurance, verification and validation, reliability estimation, and/or the like. Testing can be used as a generic metric as well. Correctness testing and reliability testing are two major areas of testing. Software testing is often a trade-off between budget, time and quality.

For instance, one part of software testing may include instrumentation (e.g., monitoring, tracing, etc.) of exception handling by the software and/or operating system (i.e., the process of responding to the occurrence, during computation, of exceptions or, in other words, anomalous or exceptional events that require special processing) to gauge how the software responds to the exceptions. To improve the coverage of a test, test engineers often manually introduce faults into test code paths that might otherwise rarely be followed. For instance, compile-time injection involves modifying the source code to inject simulated faults into a system while runtime injection involves use of a software trigger to inject a fault into a running software system.

Tracing typically involves recording information about the execution of the software (e.g., after fault injection) such as recording a timestamp that indicates when a particular function was called, the process running when the function was called, etc. In one arrangement, a kernel tracing framework may provide a set of programs and application program interfaces (APIs) that may be used to present an overview of the performance of any part of the software as well as to debug or observe operations within the software. When the tracing framework is activated, a tracing event is recorded in any appropriate manner and/or location (e.g., buffer) whenever an execution thread executing in the system encounters a trace point (i.e., a point in the execution path of the thread at which data about the state of the software is collected).

For instance, DTrace® is a comprehensive dynamic tracing framework created by Sun Microsystems that can be used to observe the runtime behavior of user level programs (and of the operating system itself) for troubleshooting kernel and application problems on production systems in real time. Broadly, DTrace can be used to obtain a global overview of a running system (e.g., such as the amount of memory, CPU time, filesystem and network resources used by the active processes) as well as more fine-grained information (e.g., such as a log of the arguments with which a specific function is being called, a list of the processes accessing a specific file, etc.).

Figure 1:
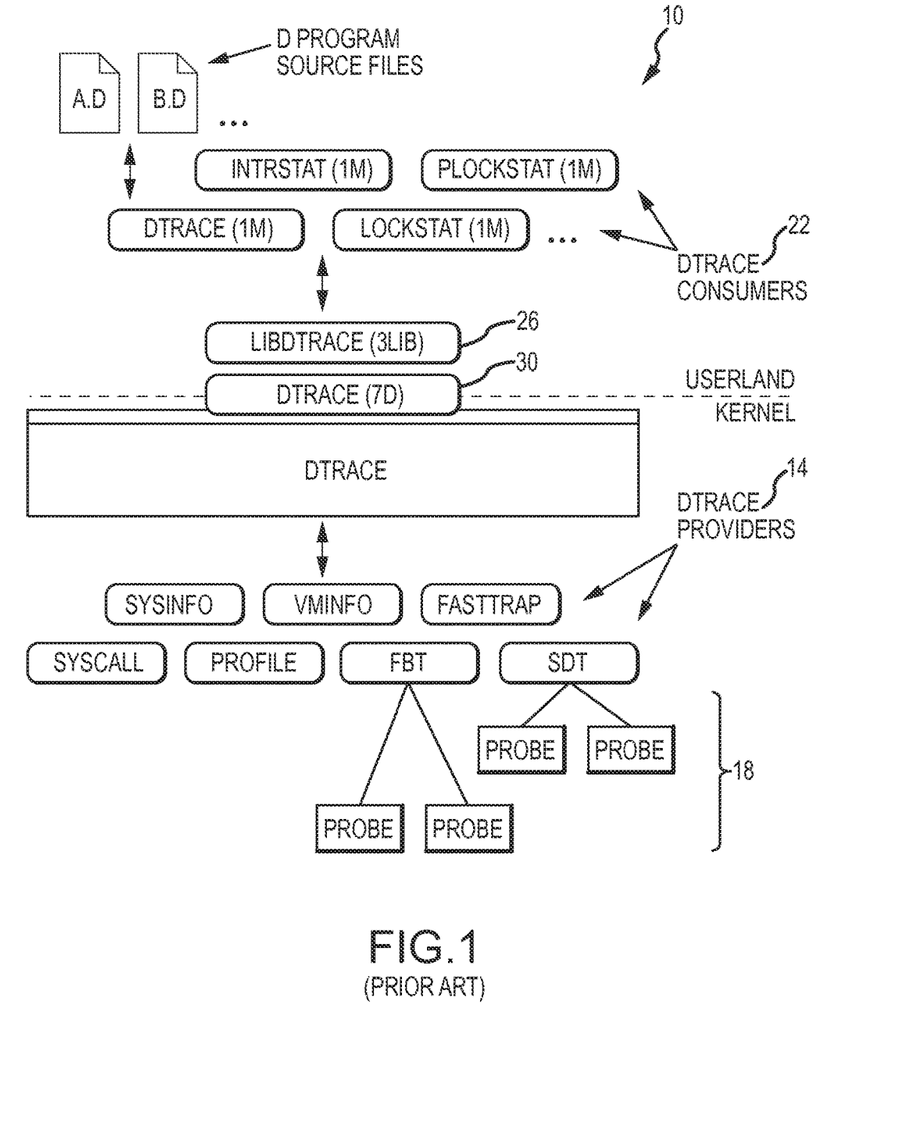
FIG. 1 is a schematic block diagram of a DTrace architecture or framework 10 according to the prior art.

FIG. 1 illustrates a schematic block diagram of a DTrace architecture or framework 10 according to the prior art. As shown, the framework 10 broadly includes a plurality of DTrace providers 14 (e.g., kernel modules such as syscall, profile, sdt, etc.) in kernel space (e.g., of memory of a computer or computing system, see FIG. 6) that publish a plurality of DTrace "probes" 18. A probe 18 is a location or activity to which the framework 10 can bind a request to perform actions, such as logging the system calls or function calls in user level processes, recording a stack trace, recording timestamps, and so on. A probe is said to fire when the activity, as specified by the probe description, takes place. In this regard, each probe 18 may be likened to a sensor that may be inserted into the code of a program or software at an instrumentation point (e.g., in or adjacent a test code path) to monitor, record and report back on exception handling. Unless the probes 18 are used, the probes 18 have a zero impact on the performance of the application or the system as a whole.

Once the probe points are integrated, the application code is compiled and the resulting binary file is run, the probes 18 become available for consumption by DTrace user level consumers 22. A DTrace consumer 22 is any process that interacts with the framework 10 and specifies the instrumentation points (the points in the code where the probes are inserted) by specifying probe descriptions. The framework 10 also includes a library interface 26 used by the consumers 22 to access the probes 18 through a DTrace kernel driver 30.

SUMMARY

Testing exception paths in software has always been a difficult endeavor due to complications often involved in reproducing such exception paths, especially as such paths are not supposed to occur in the first place. Generally, code needs to be modified to induce failure and thus requiring recompiling. Alternatively, a test with a debugger can set breakpoints and manually manipulate data.

Typically, the industry (e.g., test engineers) either does a one off or else writes test scripts that aim to introduce faults into the software code. However, these test scripts are often difficult to write and maintain and the written test scripts do not always cause the desired type of fault. Further complicating matters is that test engineer and the software writer (e.g., developer) are typically different people and from different groups. Specifically, the tester usually does not have enough intimate knowledge of the technology and code to execute a decent test and the software writer does not have the tools to automate and maintain test infrastructures. As a result, automated tests and scripts easily break because of simple changes in the software code.

The inventors have determined that systems, methods and the like are needed that allow software developers to specify or explain to test engineers how to execute various different test paths through the software. As will be discussed more fully in the discussion that follows, various sets of instructions for manipulating code and/or data of a software product (e.g., simulating faults) may be embedded (e.g., at software development time) directly into the software product to be tested. A user application of a software manipulation framework may expose a list of all of the instruction sets embedded in a particular software product, such as to a test engineer or the like in conjunction with one or more testing procedures to be performed on the software. Unless accessed by the test engineer, all of the instruction sets may be represented by noops or placeholders at runtime to limit performance impact on the computing system on which the software product is being executed.

For instance, assume a test engineer desires to ascertain whether or not an operating system's firmware still updates correctly during a checksum corruption or error that occurs in the firmware. In this regard, the test engineer may identify and select (e.g., through the user application) a "checksum" manipulation instruction set from the list which may cause an extraction engine of the software manipulation framework to locate and extract the checksum probe instruction set from the firmware and pass the same to a compiling engine of the disclosed framework to compile one or more testing scripts from the extracted instruction set. In conjunction with compiling of the software product from source code into object code, each of the embedded instruction sets may be replaced with corresponding noops (or other placeholder objects or structures). At run-time, the address location of the noop for the checksum instruction set may be replaced with the particular corresponding code manipulation script(s) (and/or related testing code derived from the script(s)) and then the firmware update may be run or executed which eventually causes manipulation of data and/or code in the software (and the checksum error to occur). In one embodiment, the test engineer may deploy any appropriate tracing or monitoring process(es) (e.g., one or more DTrace probes within or near the fault path) to determine whether the firmware update occurs properly and/or how the firmware update occurs in conjunction with the checksum corruption.

Rather than the test engineer writing test/fault simulation scripts for previously developed or written software, the test engineer can simply manipulate the framework to extract one or more desired code manipulation instruction sets already embedded in a software product to be tested and/or analyzed, compile the instruction sets into one or more corresponding scripts, and focus on the software's response to the faults (e.g., or one more fault or error paths in the code) resulting from the code/data manipulation. As such, the onus of developing and maintaining what may be complicated fault injection routines may fall on the respective software development experts which represents a major shift in the typical industry. That is, the software developer(s), rather than the testers(s), may become responsible for writing and maintaining the error simulation tests.

In one aspect, a computer-implemented method includes extracting, from a portion of a software program product, embedded instructions for manipulating data in the software program product; generating a script for manipulating the data from the extracted instructions; compiling the software program product into a binary file, where the compiling includes replacing the portion of the software program product with a noop; using the script, replacing the noop with code for manipulating the data; and executing the binary file to execute the data manipulation code and simulate an error path in the binary file.

In one arrangement, the method may include sending, from a user application, a request to extract the embedded instructions from the software program product. For instance, the software program product may include a plurality of sets of embedded instructions and the sending includes sending a request to extract one of the embedded instruction sets. In another arrangement, the method further includes monitoring the error path in the binary file (e.g., by inserting at least one tracing probe into the error path in the binary file).

In another aspect, a computer-implemented method for developing a software program product includes writing code of a software program product, and embedding, during the writing, at least one instruction set into a location in the code, where the at least one instruction set provides instructions for manipulating data in the software program product to simulate a fault path in the software program product at run-time.

In a further aspect, a computing platform for manipulating code of a software product includes an extraction engine, executable by a processor, that extracts, from a portion of a software program product, embedded instructions for manipulating code of the software product; and a compiling engine, executable by the processor, that receives the extracted code manipulation instructions and generates a corresponding code manipulation script. The code manipulation script is inserted into the software product at runtime to manipulate the code as set forth in the extracted code manipulation instructions.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Various embodiments herein include utilities that allow software developers and the like to specify or explain how to execute various different manipulations of software code and/or data in the code. In one arrangement, manipulation instructions may be embedded directly into the code that may be accessed and executed by test engineers at run-time to induce fault paths and the like for analyzing the software's response to the induced fault. For instance, a user application of a software manipulation framework may expose a list of all of the instruction sets to a test engineer or the like in conjunction with one or more testing procedures to be performed on the software. Unless accessed by the test engineer, all of the code manipulation instruction sets may be represented by noops or placeholders at runtime to limit performance impact on the software. In conjunction with introduction of the checksum error, the test engineer may deploy any appropriate tracing or monitoring process(es) (e.g., one or more DTrace probes within or near the fault path) to determine whether the firmware update occurs properly and/or how the firmware update occurs.

Rather than the test engineer writing test/fault simulation scripts for previously developed or written software, the test engineer can simply manipulate the framework to extract one or more desired embedded manipulation instruction sets, compile the instruction sets into one or more corresponding scripts, and focus on the software's response to the faults (e.g., or one more fault or error paths in the code) resulting from the code/data manipulation. As such, the onus of developing and maintaining what may be complicated fault injection routines may fall on the respective software development experts which represents a major shift in the typical industry. That is, the software developer may become responsible for writing and maintaining the error simulation tests rather than the testers.

Figure 2:
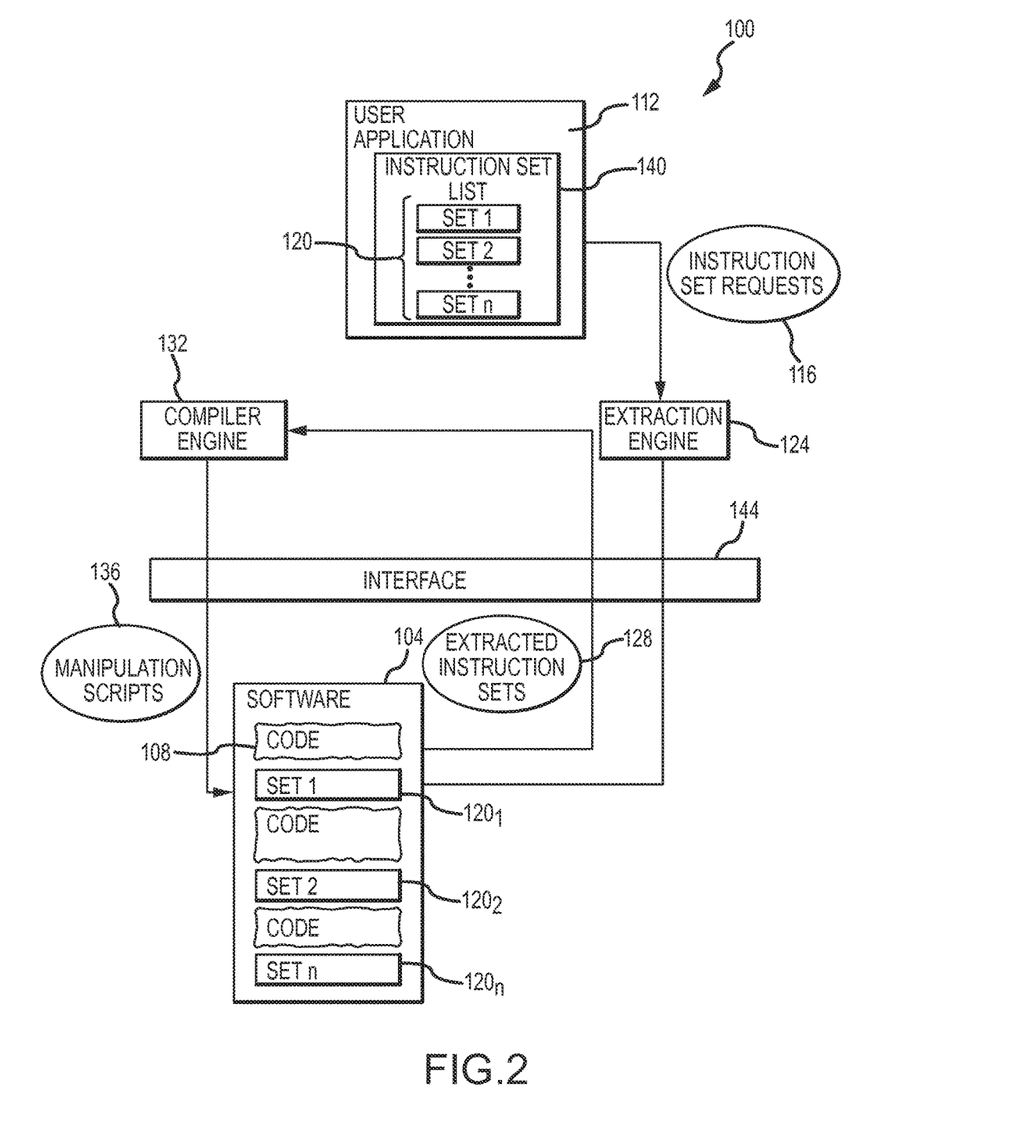
FIG. 2 is a schematic block diagram that illustrates a framework for extracting manipulation code from a software product, compiling the extracted manipulation code into a script, and inserting the script back into the code at run-time to manipulate data or code of the software product.

With brief reference now to FIG. 2, a framework 100 is illustrated for manipulating code 108 of a software program product 104 (e.g., kernel, driver, operating system, etc.) in real-time, where a response to the code manipulation (e.g., exception handling) by the software, computing system, etc. may be monitored in any appropriate manner (e.g., tracing or monitoring scripts, such as through the use of one or more DTrace probes or the like). Broadly, a user may access a user application 112 to send one or more requests 116 for code manipulation instruction sets 120 embedded in the software product 104 to an extraction engine 124. The extraction engine 124 may then appropriately identify and extract the requested code instruction set 120 from the software product 104 which is passed to a compiler engine 132. The compiler engine 132 may then generate one or more corresponding code manipulation scripts 136 from the extracted instruction sets 128 and facilitate insertion of the code manipulation scripts into the software product 104 at run-time to cause manipulation of the code 108 in the software product 104 at run-time (e.g., to cause an error or fault path in the code 108). The software product's 104 or computing system's response to the code manipulation (e.g., to the injected fault path) may be monitored in any appropriate manner.

Figure 3:
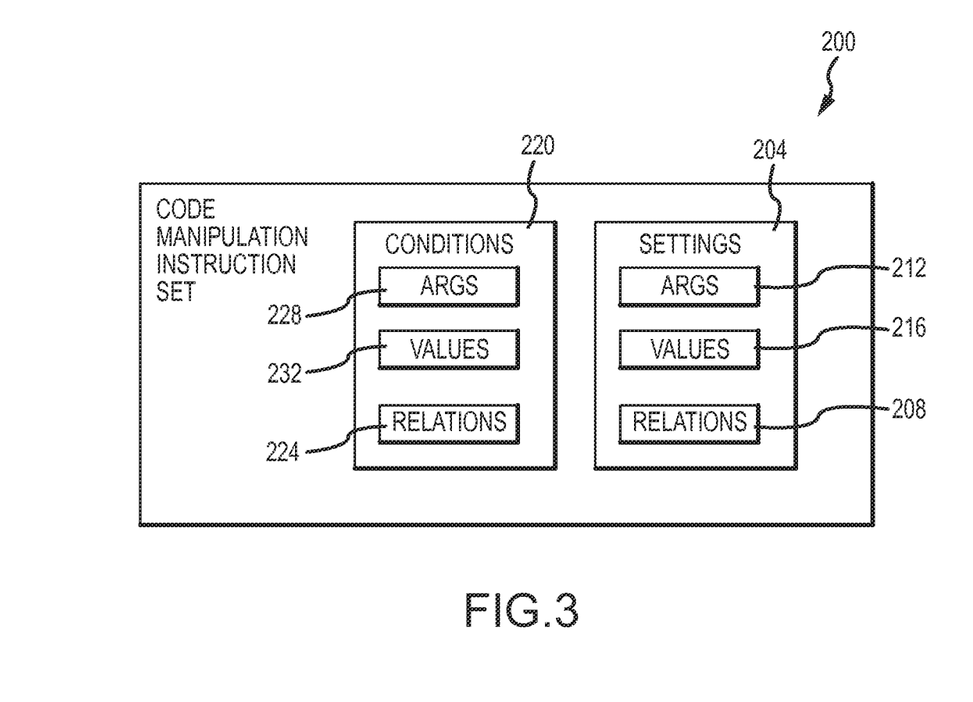
FIG. 3 is a schematic block diagram of a code manipulation instruction set.

Before discussing the platform 100 and related methods in more detail, reference is now made to FIG. 3 which presents a schematic view of a code manipulation instruction set 200 (e.g., one of the code manipulation instruction sets 120) that a software developer or the like may embed into the software product 104 at the development stage of the software product 104 to be later accessed (e.g., by a test engineer) for manipulating the code 108 in one or more manners (e.g., in conjunction with tracing or monitoring of the code manipulation during a testing stage of the software product 104). Broadly, the code manipulation instruction set 200 may include or specify one or more settings 204 (e.g., manipulations) to be made in the code (e.g., in code 108) of the software product 104 that, when selected and triggered (e.g., by a test engineer or the like) may cause the inducement of a test or fault path in the code. As the software developer is typically more intimately familiar with the inner workings of the code (e.g., capabilities, limitations, etc.), the settings 204 may be more likely (e.g., than a subsequently prepared testing script) to cause a desired test or fault path in the software product 104.

In one arrangement, the settings 204 may include a specified relation 208 between at least one argument 212 and at least one value 216 in the code 108 that is to be implemented during run-time of the software product 104.

The specified relation 208 may include one of, but not limited to, equal, not equal, greater than, less than, bit or, or bit and. As one overly simplified example, the software developer could specify that an argument 212 "x" in the code is to take the value 216 of (i.e., is to equal) "2" (e.g., as opposed to a different value in the absence of the instruction set 200), where changing the value of x to 2 will or is highly likely to cause a fault in the code during run-time. As another example, the argument 212 x may be set to be some value 216 greater than 5.

In one arrangement, the processor (e.g., processor 604 of FIG. 6) may, based on the instruction set 200, randomly generate and assign a value 216 to the argument 212 x that is greater than 5 (e.g., 10, 80, etc.). In another arrangement, the test engineer or the like may, as part of requesting extraction of the instruction set 200 from the software product 104 (e.g., in conjunction with any appropriate monitoring and/or tracing procedures), specify some value 216 for the argument 212 x that is greater than 5. Various more complicated settings or manipulations of the code 108 may be specified in the instruction set 200, all of which are encompassed herein. In some embodiments, a particular test procedure may require extraction and execution of a plurality of code manipulation instruction sets 200.

In one variation, the code manipulation instruction set 200 may also include one or more prerequisite conditions 220 to be met in the code 108 of the software product 104 before the settings 204 may be implemented. Stated differently, the code manipulation instruction set 200 may specify that one or more conditions 220 must be met in order for the settings 204 to be applied. Otherwise, the settings 204 may not be applied. In this regard, the conditions 220 and settings 204 may collectively be in the form of or otherwise represent an "if-then-otherwise" type statement. For instance, the conditions 220 may include a specified relation 224 between at least one argument 228 and at least one value 232 in the code 108 (e.g. where the argument 228 may be the same as or different than the argument 212 in the settings 204). As an example, if the conditions 220 specified that x equals 2, then a setting 204 specifying that y is to be less than 8 (e.g., and which may cause a particular exception or fault to occur) may not be implemented at run-time unless x equals 2. In one arrangement, the processor may automatically configure or set x to equal 2 (e.g., and thus y to be some value less than 8), based on the instruction set 200, upon a test engineer requesting extraction and implementation of the instruction set 200. In another arrangement, the test engineer or the like may include, with the request to extract and implement the instruction set 200, a request to set x to equal 2 (e.g., and a request that y is to equal 3 or some other value less than 8).

Set forth below is one specific implementation of a code manipulation instruction set (e.g., code manipulation instruction sets 200, 120) (although it is to be understood that the below instruction set is merely for purposes of example and that the present disclosure is not necessarily limited to the specific format):

<N>(ERIS_<test name>_<instruction set name>_<[cnd cmd[cnd cmd[cnd cmd]]]>_<set cmd[set cmd[set cmd]]>_[n], <type arg[0]>, <arg[0]>,...<type arg [N−1]>, <arg[N−1]>)

The following tables provide definitions and examples for the above instruction set. In one embodiment, the instruction set may be defined in a language similar to that used to define the previously discussed DTrace probes. In the below tables, the acronym "ERIS" stands for "Embedded Response Instruction Set" and describes the above discussed settings 204 and conditions 220.

| Symbol | Definition | Example |
|---|---|---|
| N | Number of arguments in the instruction set. An argument may be defined by its type and value. | 2, 4, etc. |
| type arg[N] | Data type of the argument being passed. | int, uint64_t, uint64_t *, char *, etc. |
| arg[N] | Argument being peeked or poked at. | 1, x, &x, etc. |
| test name | Name of the error injection test for which the instruction set is intended. As a sequence of events (code/data manipulations) may be necessary to properly inject an error path, the test name ties together all of the events. | NIC_TX_STALL, HBA_FW_CHECKSUM, etc. |
| instruction set name | Name of a particular instruction set for uniqueness. | tx_head, fw_payload, etc. |
| cnd cmd | Conditions that must be met in order for the manipulation settings to be implemented. In one embodiment, the arguments are only for the setting commands if no condition commands are specified. In other arrangements, the first two arguments are for the condition command if only one condition command is specified, the first four arguments are for the condition command if two condition command are specified, and so on. | (see below) |
| set cmd | How to modify the data and/or code of the software product. In one arrangement, the last two arguments specified in the instruction set may always be used for at least one set command. | (see below) |
| N | Number of times the instruction set is to be triggered before exiting the script. | 1, 2, 3, etc. |

Condition Commands

| Symbol | Command | Arg x | Arg x + 1 (y = x + 1) | Example |
|---|---|---|---|---|
| EQ | Equal | Data to compare | Value for data to compare against | if (arg x == arg y) |
| NE | Not equal | (same) | (same) | if (arg x != arg y) |
| GT | Greater than | (same) | (same) | if (arg x > arg y) |
| LT | Less than | (same) | (same) | if (arg x < arg y) |
| BO | Bit or | (same) | (same) | if (arg x | arg y) |
| BA | Bit and | (same) | (same) | if (arg x & arg y) |

Set Commands

| Symbol | Command | Arg x | Arg x + 1 (y = x + 1) | Example |
|---|---|---|---|---|
| EQ | Equal | Address to modify | Data to set | *arg x = arg y |
| NE | Not equal | (same) | (same) | *arg x ~= arg y |
| GT | Greater than | (same) | (same) | *arg x = arg y + 1 |
| LT | Less than | (same) | (same) | *arg x = arg y − 1 |
| BO | Bit or | (same) | (same) | *arg x = arg y |
| BA | Bit and | (same) | (same) | *arg x &= arg y |

Reference will now be made back to FIG. 2 as well as to FIG. 5 which presents a flow diagram of a method 500 of extracting and implementing (e.g., at run-time) at least one embedded code manipulation instruction set in a software product 104. As discussed previously, the platform 100 of FIG. 2 may include any appropriate user application 112 through which a user (e.g., test engineer or the like) may make requests for extraction and implementation of one or more code manipulation instruction sets. For instance, assume a software developer or the like has already written a software product 104 that the user wants to manipulate in one or more particular manners (e.g., for purposes of monitoring the software product's 104 response to one or more faults, exceptions, errors, and/or the like induced by the one or more manipulations). Further assume the software developer or the like has embedded one or more instruction sets 120 (e.g., instruction sets 200) into the code 108 at one or more particular locations in the software product 104 as discussed herein.

Figure 5:
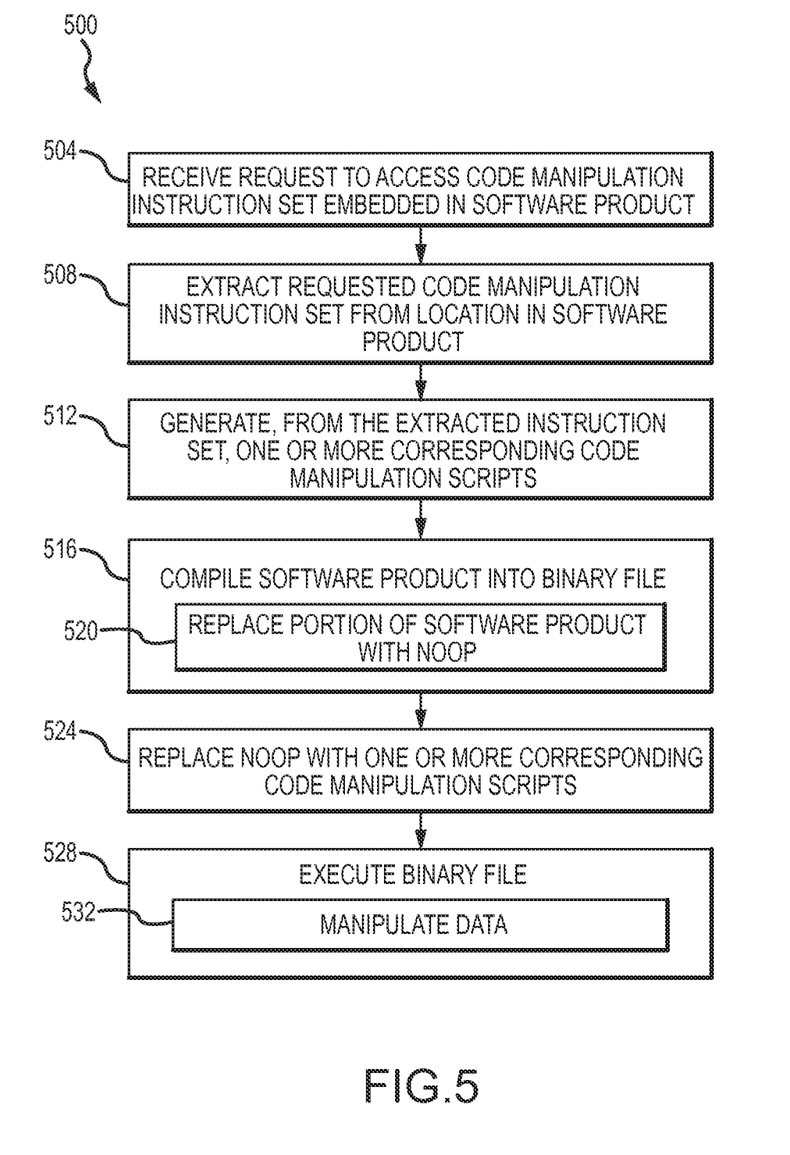
FIG. 5 is a flow diagram of a method for use in extracting an embedded response instruction set from a software product and executing the set at run-time to manipulate code or data of the software product.

In one arrangement, the user may, via the user application 112 or the like, be presented (e.g., on a display of or in communication with the computing system of FIG. 5) with a list 140 (or other indication) of all of the available code manipulation instruction sets 120 embedded in the subject software product 104. In one arrangement, the list 140 may be obtained from any appropriate symbol table or the like. As just one example, the list 120 may include a first instruction set that is configured to induce a checksum corruption error and a second instruction set that is configured to induce an electrically erasable programmable read-only memory (EEPROM) corruption error.

In any case, the method 500 may include receiving 504 a request to access one or more of the code manipulation instruction sets 120 and then extracting 508 the requested instruction sets 120 from one or more locations in the software product 104. For instance, upon the user application 112 receiving a selection of one or more of the instruction sets 120 (e.g., via the user through any appropriate user interface), the user application may generate and pass a request 116 (e.g., message) for the requested instruction sets 120 to the extraction engine 124 which may serve to extract 508 the requested instruction sets from one or more particular locations in the software product 104. The request 116 may include any appropriate identifier that uniquely identifies the requested instruction set(s) 120 from other ones of the instruction sets 120. In one arrangement, the request 116 may also include any appropriate variables, input, values, and/or the like corresponding to the requested instruction set(s). For instance, and with reference to the previously discussed example where the settings 304 of the instruction set 300 specified that the argument "x" was to be greater than 5, the user application 112 may request that the user specifies some value for the argument x that is greater than 5. The user application 112 may then include any such values, input, etc. with the request 116.

Figure 6:
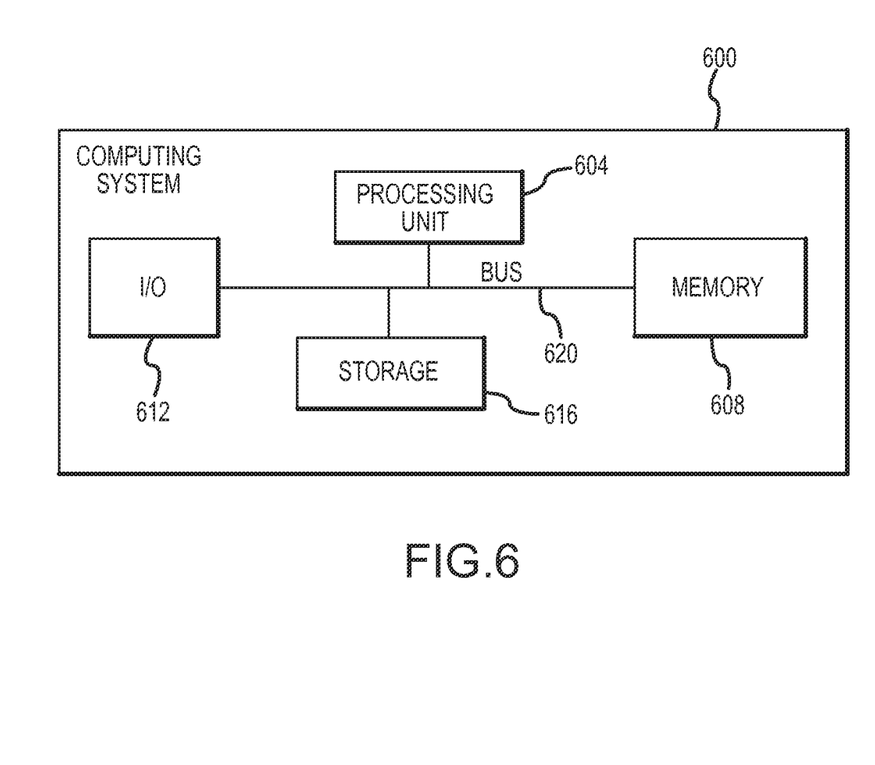
FIG. 6 is a schematic block diagram of a computing system in which the systems, methods and the like herein may be implemented.

As mentioned above, the extraction engine 124 then serves to facilitate extraction of the instruction set(s) identified in the request 116 from one or more locations in the software product 104, such as from one or more locations in memory 608 of FIG. 6 assigned to the software product 104 (e.g., via accessing any appropriate symbol table and/or the like). In one arrangement, the extraction engine 124 may utilize any appropriate interface 144 (e.g., library interface 26 of FIG. 1) to extract the requested instruction sets 120 embedded in the software product 104.

With reference to FIG. 5, the method 500 may include generating 512, from the extracted instruction set(s) 128, one or more corresponding code manipulation scripts 136. For instance, the compiler engine 132 may receive the extracted instruction set(s) 128 (e.g., via interface 144) and compile the extracted instruction sets 128 into the one or more code manipulation scripts 136. The method 500 may also include compiling 516 the software product 104 into a binary file (e.g., compiling the software product 104 from source code to object code), where the compiling 516 includes replacing 520 each of the instruction sets 120 in the software product 104 with corresponding noops (or other placeholder structures).

Figure 4:
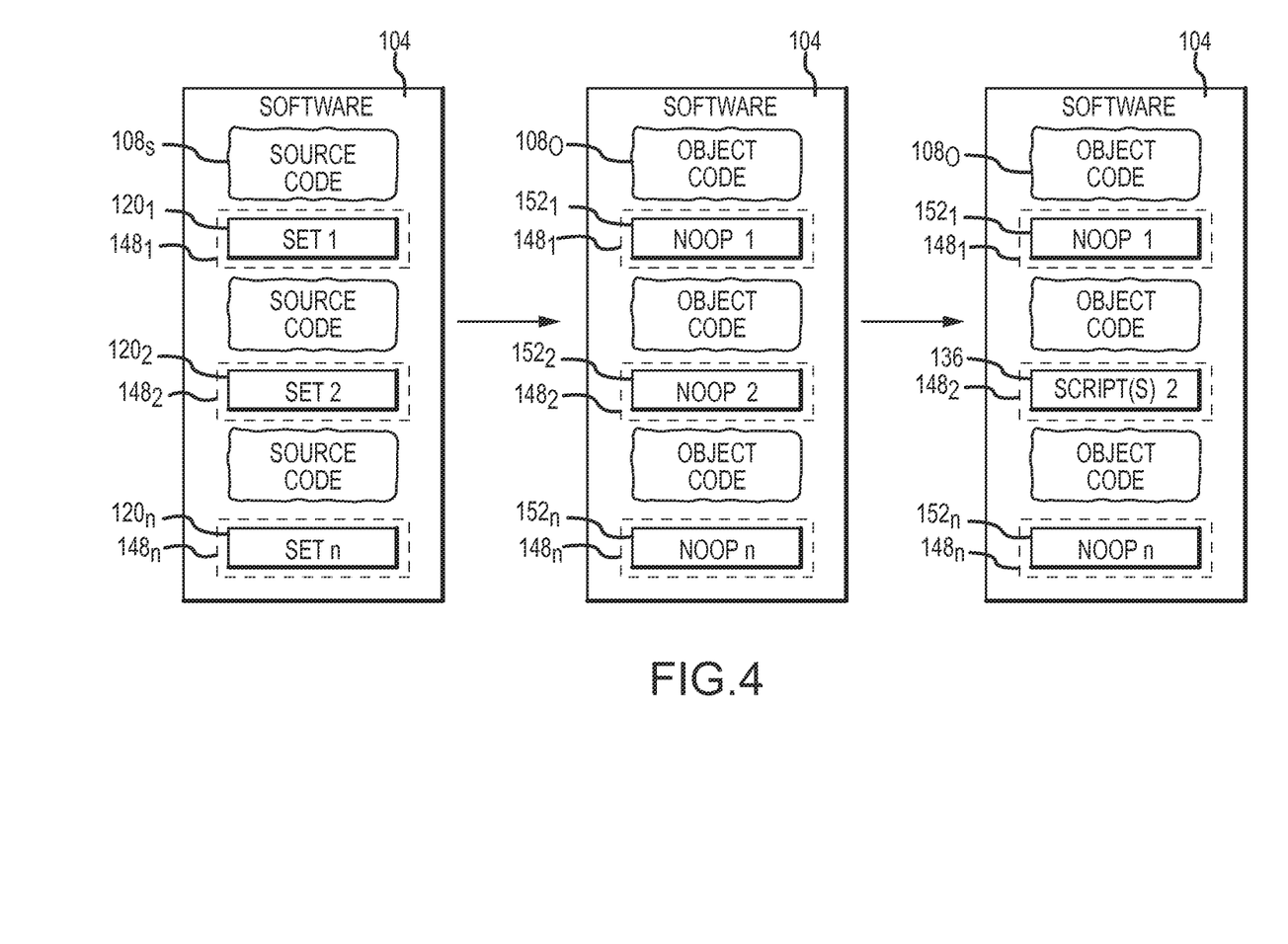
FIG. 4 is a schematic block diagram illustrating the software product of FIG. 2 at various stages in a process of extracting and executing code manipulation instruction sets embedded therein.

With additional reference now to FIG. 4, a number of stages of the software product 104 are shown. In the first (leftmost) stage of the software product 104 which illustrates the software product 104 before the compiling 516, code manipulation instruction sets $120_1$, $120_2$, $120_n$ may be embedded in the code 108, (source code) at three respective locations $148_1$, $148_2$, $148_n$. As shown in the middle stage of FIG. 4, the software product 104 is compiled 516 into a binary file (e.g., which includes compiling the source code 108, into object code $108_o$). Furthermore, the compiling 516 step may include replacing 520 the code manipulation instruction sets $120_1$, $120_2$, $120_n$ at the three respective locations $148_1$, $148_2$, $148_n$ with corresponding respective noops $152_1$, $152_2$, $152_n$. The method 500 may then include replacing 524 the noop(s) 152 corresponding to the particular requested instruction set(s) 120 with the corresponding one or more code manipulation scripts 136. Specifically, the replacing 524 may involve compiling or translating the one or more code manipulation scripts 136 into corresponding object/machine code for manipulating data in the software product 104 and then replacing the noop(s) 152 corresponding to the particular requested instruction set(s) 120 with the corresponding object/machine code of the one or more code manipulation scripts 136.

With reference to FIG. 4, assume instruction set "2" $120_2$ was the subject instruction set 120 in the instruction set request 116 and in the receiving 504 step but that instruction set "1" $120_1$ and "n" $120_n$ were not requested in the request 116 and in the receiving 504 step. In this regard, only the noop 152 associated with instruction set 2 $120_2$ (i.e., noop $152_2$) would be replaced with a corresponding script 136 ("script 2")(i.e., the corresponding translated machine code corresponding to script 2) during the replacing 524 step. Accordingly, the locations $148_1$, $148_n$ continue to include respective noops $152_1$, $152_n$.

The method 500 may then include executing 528 the binary file (e.g., the third stage of the software product 104 in FIG. 4) which includes manipulating data 532 in the software product 104 in the manner set forth in the script 136 (in "script 2"). As an overly simplistic example, execution of the script 136 may set variable "x" to be equal to 9, or may set variables x and y to be equal to 3 and 15, respectively. It is noted how the remaining noops $152_1$, $152_n$ have little to no negative effect on system performance during execution 528 (e.g. at run-time) of the binary file. Accordingly, while the software developer can embed various instruction sets 120 at various locations in the software product 104, only requested instruction sets may be extracted, compiled and then inserted into the product at run-time. As discussed previously, the user may deploy any appropriate tracing processes or modules to monitor the software product's 104 response (e.g., and/or responses of one or more other software products) to the data manipulation 532. However, it is to be understood that the present disclosure is not limited to use with monitoring or testing exception/fault/error paths in software products. For instance, the disclosed code manipulation instruction sets and processes disclosed herein may be used in other contexts such as, but not limited to, workarounds, encryption, cyclic redundancy checking (CRC), and the like.

FIG. 6 illustrates a computing system 600 that may be used to implement any of the various utilities disclosed herein, such as embedding code manipulation instruction sets into software products, extracting and compiling one or more of the code manipulation instruction sets into corresponding code manipulation scripts, inserting the scripts into the software product and executing the software product to manipulate data, code, etc. as set forth in the scripts, monitoring the manipulations as appropriate, and the like. The computer or computer system 600 may take a wide variety of forms to practice the invention but generally may include processing unit 604 (e.g., processor(s), processor core(s), etc.) that runs software or program modules from memory 608 (e.g., RAM) to perform particular functions. In this regard, the computing system 600 may be considered a special-purpose or particular machine adapted for implementing the embedded code manipulation instruction sets as set forth herein.

The processing unit 604 also controls operation of input/output (I/O) devices 612 such as a keyboard, mouse, display such as a touch screen or monitor, and the like that allow a software programmer/developer to embed one or more code manipulation instruction sets into one or more software products 104 and a test engineer or other user to extract and compiling one or more of the code manipulation instruction sets into corresponding code manipulation scripts, insert the scripts into the software product and execute the software product to manipulate data, code, etc. as set forth in the scripts, and the like. The computing system 600 may also include any appropriate (non-volatile) storage arrangement 616 that can store the software products 104, user application 112, and the like before being appropriately loaded into memory 608 for manipulation by processing unit 604. The various components can be interconnected by a system bus 620 in any appropriate manner. While illustrated as a single device or system, the computing system 600 may in some embodiments be spread among a number of devices or components (e.g., in a cloud computing or distributed processing environment). Furthermore, various details of the computing system 600 have been left out in the interest of brevity.

It will be readily appreciated that many deviations may be made from the specific embodiments disclosed in the specification without departing from the spirit and scope of the invention. Also, it should be understood that the functionalities performed by many of the processes and modules discussed herein may be performed by other modules, devices, processes, and the like. As just one example, the extraction engine 124 and compiler engine 132 may be embodied in a single engine or module even though they have been illustrated as being separate engines in FIG. 2. In this regard, the illustrations and discussion herein has only been provided to assist the reader in understanding the various aspects of the present disclosure.

Embodiments disclosed herein can be implemented as one or more computer program products, i.e., one or more modules of computer program instructions encoded on a computer-readable medium for execution by, or to control the operation of, data processing apparatus. For example, the various components (e.g., modules, markers, and the like) of the framework 100 (e.g., user application 112, extraction engine 124, compiler engine 132, software product 104, etc.) may be provided in such computer-readable medium and executed by the processing unit 604 or the like. The computer-readable medium can be a machine-readable storage device, a machine-readable storage substrate, a memory device, a composition of matter affecting a machine-readable propagated signal, or a combination of one or more of them. The computing system 600 may encompasses one or more apparatuses, devices, and machines for processing data, including by way of example a programmable processor, a computer, or multiple processors or computers. In addition to hardware, the computing system 600 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., embedding code manipulation instruction sets in software products; extracting, compiling and executing corresponding code manipulation scripts; and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

In different embodiments, the computing system 600 may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, smartphone, tablet, video game console, handheld video game device, a peripheral device such as a switch, modem, router, or, in general, any type of computing or electronic device.

The above described embodiments including the preferred embodiment and the best mode of the invention known to the inventor at the time of filing are given by illustrative examples only.

We claim:

1. A computer-implemented method, comprising:
   extracting, from a portion of a software program product, embedded instructions for manipulating data in the software program product;
   generating a script for manipulating the data from the extracted instructions;
   compiling the software program product into a binary file, wherein the compiling includes replacing the portion of the software program product with a noop;
   using the script, replacing the noop with code for manipulating the data; and
   executing the binary file to execute the data manipulation code and simulate an error path in the binary file.

2. The computer-implemented method of claim 1, further including:
   receiving, from a user application, a request to extract the embedded instructions from the software program product.

3. The computer-implemented method of claim 2, wherein the software program product include a plurality of sets of embedded instructions, and wherein the receiving includes receiving a request to extract one of the embedded instruction sets.

4. The computer-implemented method of claim 3, further including:
receiving, at the user application, a list of the embedded instruction sets; and
receiving, at the user application, a selection of one of the embedded instruction sets from the list.

5. The computer-implemented method of claim 1, further including:
monitoring the error path in the binary file.

6. The computer-implemented method of claim 5, further comprising:
inserting at least one tracing probe into the error path in the binary file, wherein the inserted tracing probe monitors the error path in the binary file.

7. The computer-implemented method of claim 6, further including:
recording, with the at least one tracing probe, information associated with execution of the binary file through the error path.

8. A computer-implemented method for developing a software program product, comprising:
writing code of a software program product; and
embedding, during the writing, at least one instruction set into a location in the code, wherein the at least one instruction set provides instructions for manipulating data in the software program product to simulate a fault path in the software program product at run-time, wherein the embedded instruction set is configured to be extracted from the location in the software program product before compilation of the software program product, and wherein the embedded instruction set is configured to be replaced by a noop at the location in the code during compilation of the software program product.

9. The computer-implemented method of claim 8, further comprising:
specifying at least one manipulation to be made to data in the code; and
generating the at least one instruction set from the at least one specified manipulation.

10. The computer-implemented method of claim 9, wherein the specifying the at least one manipulation includes specifying a relation between at least a first argument and at least one value in the code.

11. The computer-implemented method of claim 10, wherein the specified relation between the first argument and the at least one value includes one of equal, not equal, greater than, less than, bit or, or bit and.

12. The computer-implemented method of claim 8, further comprising:
specifying at least one condition to be met in the code;
specifying at least one manipulation to be made to data in the code in response to detection of the at least one condition; and
generating the at least one instruction set from the at least one specified condition and manipulation.

13. The computer-implemented method of claim 12, wherein the specifying the at least one code condition includes specifying a relation between at least a first argument and at least one value in the code.

14. The computer-implemented method of claim 13, wherein the specified relation between the first argument and the at least one value includes one of equal, not equal, greater than, less than, bit or, or bit and.

15. The computer-implemented method of claim 8, wherein the extracted instruction set is configured to be compiled into one or more corresponding scripts, and wherein machine code compiled from the one or more corresponding scripts is configured to replace the noop at the location during run-time of the software product.

16. The computer-implemented method of claim 8, wherein the data is not manipulated unless the embedded instruction set is extracted from the code, compiled into a script, and inserted into the code at run-time.

17. A computing platform for manipulating code of a software product comprising:
a processor;
an extraction engine, executable by the processor, that extracts, from a portion of a software program product, embedded instructions for manipulating code of the software product; and
a compiling engine, executable by the processor, that receives the extracted code manipulation instructions, generates a corresponding code manipulation script, and compiles the code manipulation script into corresponding machine code, wherein the machine code is inserted into the software product at runtime to manipulate the code as set forth in the extracted code manipulation instructions.

18. The computing platform of claim 17, further including:
a user application, executable by the processor, for receiving a request to extract the embedded code manipulation instructions, wherein the user application passes the request to the extraction engine.

19. The computing platform of claim 18, wherein the user application is configured to present a list of embedded code manipulation instruction sets to a user, wherein the requested embedded code manipulation instructions comprises one of the embedded code manipulation instruction sets in the list.

* * * * *

UNITED STATES PATENT AND TRADEMARK OFFICE
CERTIFICATE OF CORRECTION

PATENT NO. : 10,229,029 B2
APPLICATION NO. : 14/247410
DATED : March 12, 2019
INVENTOR(S) : Tsaur et al.

Page 1 of 1

It is certified that error appears in the above-identified patent and that said Letters Patent is hereby corrected as shown below:

In the Specification

In Column 8, Line 53, delete "*arg x = arg y" and insert -- *arg x |= arg y --, therefor.

In Column 10, Line 10, delete "108," and insert -- $108_s$ --, therefor.

In the Claims

In Column 14, Line 25, in Claim 17, delete "product" and insert -- product, --, therefor.

Signed and Sealed this
Twenty-fifth Day of February, 2020

Andrei Iancu
*Director of the United States Patent and Trademark Office*